United States Patent [19]

Rosso

[11] 4,166,397
[45] Sep. 4, 1979

[54] AIR PRESSURE GAUGE
[76] Inventor: Michele Rosso, Via Villa 122, Giaveno (Turin), Italy
[21] Appl. No.: 900,618
[22] Filed: Apr. 27, 1978
[30] Foreign Application Priority Data Dec. 12, 1977 [IT] Italy .............................. 69769 A/77

[51] Int. Cl.² .............................................. G01L 7/16
[52] U.S. Cl. ...................................................... 73/744
[58] Field of Search .............. 73/744, 745, 746, 146.8, 73/146.3

[56] References Cited
U.S. PATENT DOCUMENTS 2,903,888   4/1978   Gfoll ................................... 73/146.8

Primary Examiner—Donald O. Woodiel
Attorney, Agent, or Firm—Young & Thompson

[57] ABSTRACT

An air pressure gauge comprises a tube of rigid transparent material closed at one end and open at the other for connection to a source of pressure to be measured. The tube has graduated notches along its length and is constituted by at least two cylindrical portions connected together. One portion is adjacent the open end and the other smaller portion extends toward the closed end of the tube. A resilient piston slides in the tube and comprises a plurality of separate coaxial elements of which the outer forms a seal against the inner walls of the tube portion of greater diameter and the inner forms a seal against the inner walls of the portion of smaller diameter. The friction opposing the relative sliding between the two elements is greater than that opposing the sliding of the outer element against the inner walls of the tube portion of greater diameter.

10 Claims, 4 Drawing Figures

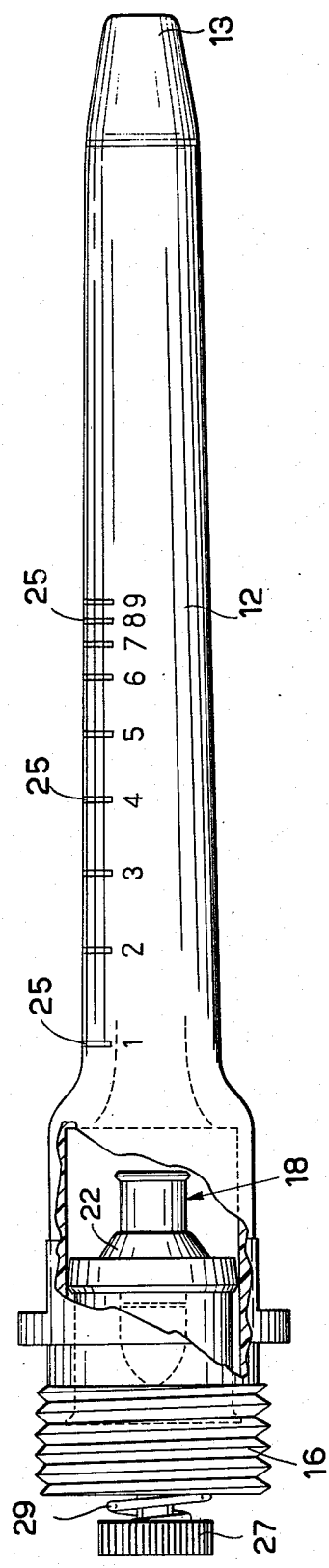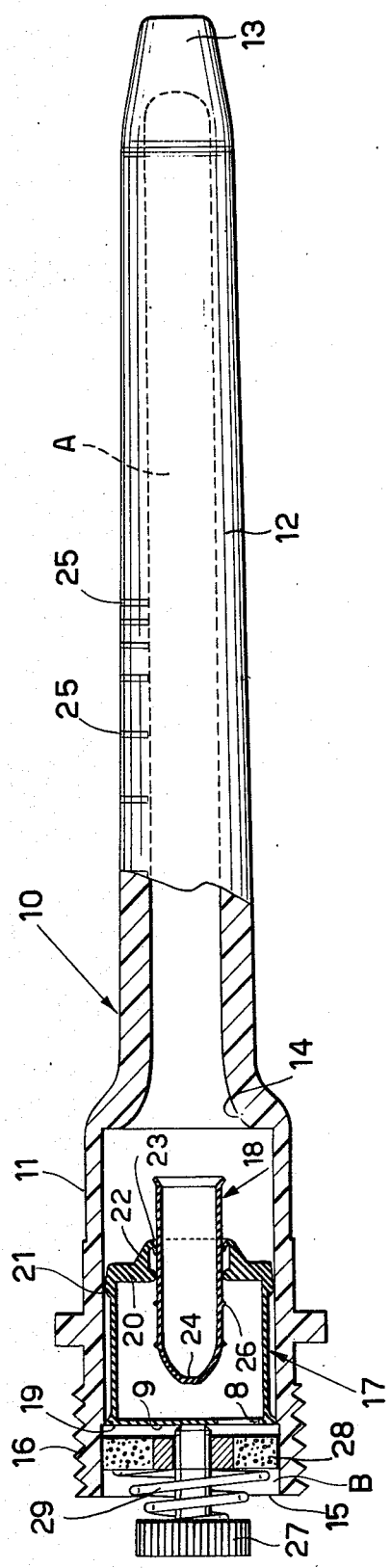

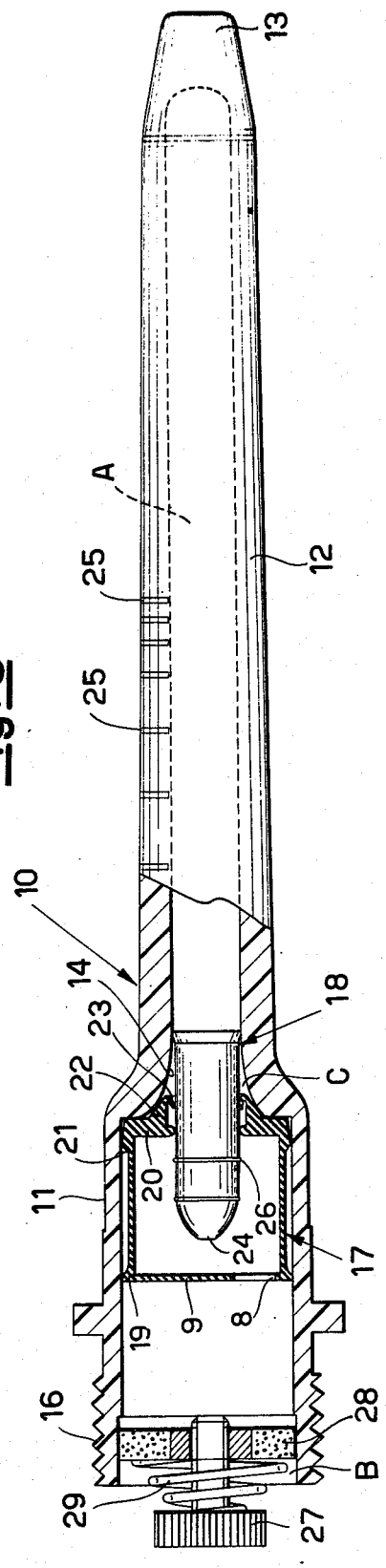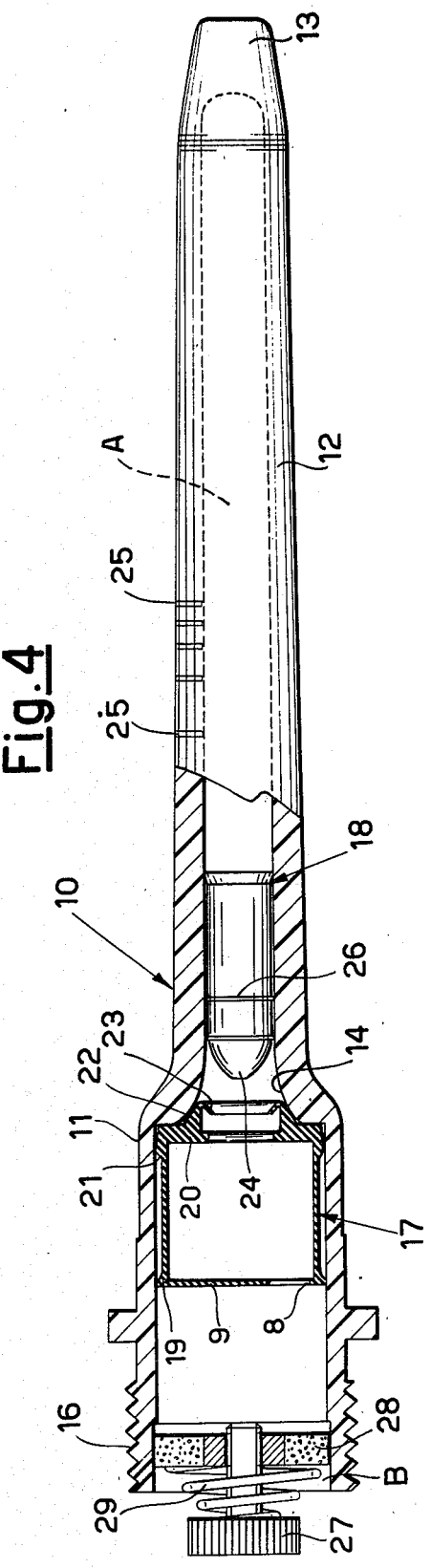

AIR PRESSURE GAUGE

This invention relates to an air pressure gauge, particularly for use in checking the pressure of vehicle tyres.

Relatively cheap air pressure gauges are known, in which the pressure to be measured is made to act on a piston opposed by a spring, in such a manner that the distance between the equilibrium position attained by the piston and its rest position, as indicated on a graduated scale, is a function of the pressure to be measured.

Pressure gauges of the aforesaid type are often inaccurate and become increasingly less accurate with use, due to the difficulty of obtaining a low priced spring with an elastic constant which is uniform within narrow tolerances, and because all springs undergo variations in their elastic constant due to fatigue and ageing.

The object of the invention is therefore to provide an air pressure gauge of simple construction which enables a higher and more durably constant accuracy to be obtained than said previous spring pressure gauges, for equal or lower cost.

This and further objects, which will be more apparent hereinafter, are attained by an air pressure gauge according to the present invention, comprising a tube of rigid transparent material closed at one end and open at the other for connection to a source of pressure to be measured, and provided with graduated notches along its longitudinal extension, wherein the tube is constituted by at least two cylindrical portions connected together, of which a first portion is adjacent to the open end, and a second portion, of smaller diameter than the first, extends towards the closed end of the tube, a piston of yieldable resilient material sliding in said tube and being constituted by at least two separate coaxial elements of which the outer forms a seal against the inner walls of the tube portion of greater diameter and the inner forms a seal against the inner walls of the second portion of smaller diameter, the friction opposing the relative sliding between the two elements exceeding that opposing the sliding of the outer element against the inner walls of the tube portion of greater diameter.

A description is given hereinafter by way of nonlimiting example of a preferred embodiment of the pressure gauge according to the invention, with reference to the accompanying drawings in which:

FIG. 1 is a partly sectional side view of an air pressure gauge according to the invention;

FIGS. 2, 3 and 4 are partial axial sections through the pressure gauge of FIG. 1 in certain operating positions.

With reference to the figures, the air pressure gauge 10 according to the invention comprises a cylindrical tube of transparent material constructed in two portions 11 and 12 of different diameters and lengths. The portion 12, of smaller diameter and greater length, is closed at its end B. At its other end it is connected by way of an internal chamfer 14 to the second portion 11. This latter terminates in a circular opening 15, at which the tube body comprises a thread 16 to enable it to be screwed in a sealed manner to a conduit from the pressure source (of known type and therefore not shown).

The tube 10 houses internally a piston comprising two concentric coaxial elements 17 and 18, both of resilient rubber.

The element 17, of substantially cylindrical shape, is hollow internally and comprises at that end facing the opening 15 a base 9 provided with a hole 8 to enable air to enter its cavity. The base 9 also comprises a flared perimetral rim 19 arranged to press against the wall of the tube 11 and form a seal against it. At its front end, the element 17 comprises a perimetral base 20 provided with perimetral lips 21 and 22, the first of which are bent parallel to the body of the element 17 and are arranged to press against the walls of the tube 11. The second lips 22 are constituted by one portion of rubber bent outwards from the element 17, and a second portion 23 bent towards the inside of the cylinder 17. When the pressure gauge is in its rest position (see FIGS. 1 and 2), the portion 23 is designed to press against the outer surface of the element 18. This latter is constituted by a resilient rubber tube closed at one end 24 and having a cross-section such that it is able to move with slight interference between the inner walls of the tube 12, as will be apparent hereinafter.

The two elements 17 and 18 must be constructed in such a manner that the friction between the lip 23 and the wall of the cylinder 18 exceeds the friction between the lip 21 and the wall of the tube 11, for the reasons given hereinafter.

Notches 25 graduated in accordance with a hyperbolic law are provided along the outer surface of the tube 12, due to the fact that the pressure in the tube in each portion varies in relation to the advancement of the cylinder 11 during the operation of the pressure gauge 10, which will now be examined.

Pressure is applied to the tube 10 through the opening 15 by known methods. The elements 17 and 18 advance together thrust by the pressure towards the connection 14 between the two portions 11 and 12 (FIG. 3). Advantageously, any accidental separation of the two elements 17 and 18 can be prevented by rings 26 provided along the cylinder 18.

When the assembly reaches the chamfer 14 and the base 20 of the element 17 rests against it, the element 18 separates from the outer element 17 (FIG. 4) to enter the portion 12, and continues to compress the air therein until it reaches its position of barometric equilibrium between the chambers A and B.

The proportionality constant of the law which relates the displacement of the cylinder 18 to the pressure is such that the portion 12 must be provided with a scale graduated hyperbolically, with the notches 28 becoming closer together towards the closed end 13 of the tube, as already seen.

When pressure is removed from the tube 10, the element 18 returns towards the tube portion 11 thrust by the pressure in the chamber A which is greater than that in the chamber B.

The cylinder 18 continues to advance until it completely re-enters the element 17 (FIG. 3) in spite of the greater friction between the two elements 17 and 18 than that between the element 17 and the wall 11, because a sealed annular chamber C is created between the base 20 and chamfer 14 to prevent any movement of the element 17 towards the opening 15 during this return stage of the cylinder 18.

The chambers A and C come into communication with each other only when the front end of the cylinder 18 leaves the wall 12 on entering the chamfer 14 (FIG. 2), and the combined pressure of these chambers is then greater than that in B of the rear tube portion 11. From this moment onwards, the elements 17 and 18 form a single unit which is thrust into the rest position of FIGS. 1 and 2, which also corresponds to the initial working position of the instrument.

The element 17 returns to zero or rest because the pressure in the chamber A is always slightly greater than that in the chamber B due to the dead space of the chamber C, the pressure of which combines with the pressure in A. Thus the piston 17 reliably returns to its rest position by being thrust by a small overpressure, which is annulled when the piston 17 is blocked, for example by a projection formed on the inner wall of the tube 11, on reaching its rest position.

This is because as the piston 17 can no longer move, the lips 21, which are very thin and resilient, bend so that they separate from the wall 11 and allow the air contained in the chamber A to flow outwards, so re-establishing the initial equilibrium in the pressure gauge.

If measurements are to be made at different altitudes, it is advantageous to provide the supply conduit with an adjustment screw 27 screwed in a hole of a filter 28. The filter 28 is forced in the opening 15 of the thread 16. A conical spiral spring 29 prevents the accidental unscrewing of the screw 27 during the handling of the apparatus.

Even if the cavity provided in the pressure gauge is not perfectly cylindrical, this does not affect the proper operation of the device, because any slight conicity thereof is compensated by greater deformation of the resilient elements of the piston.

The objects of the invention are therefore attained, by providing an air pressure gauge of low cost and high reliability, able to operate under any applied pressure, independently of the external temperature.

A description has been given by way of example of a preferred embodiment of the device according to the invention, but modifications may be made thereto without leaving its scope. For example, the shapes and dimensions of the elements can be varied, as can the number of operating stages, which could be three (or more) in number, by providing a tube with three (or more) different decreasing cross-sections, in which there slides a piston constructed in three (or more) mutually inserted concentric parts which act in the manner heretofore described with reference to the most simple and common case.

What we claim is:

1. An air pressure gauge comprising a tube of rigid transparent material closed at one end and open at the other for connection to a source of pressure to be measured, and provided with graduated notches along its longitudinal extension, wherein the tube is constituted by at least two cylindrical portions connected together, of which a first portion is adjacent to the open end, and a second portion, of smaller diameter than the first, extends towards the closed end of the tube, a piston of yieldable resilient material sliding in said tube and being constituted by at least two separate coaxial elements of which the outer forms a seal against the inner walls of the tube portion of greater diameter and the inner forms a seal against the inner walls of the second portion of smaller diameter, the friction opposing the relative sliding between the two elements exceeding that opposing the sliding of the outer element against the inner walls of the tube portion of greater diameter.

2. An air pressure gauge as claimed in claim 1, wherein the outer resilient element comprises flared perimetral lips facing the open end of the tube, and of which first lips press against the wall of the tube portion of greater diameter and second lips press against the second element internal to the first.

3. An air pressure gauge as claimed in claim 1, wherein the resilient elements are sized in such a manner as to form an annular chamber with the tube walls, in a position corresponding to a chamfer forming the connection between the two portions of different diameter, at the moment in which the inner element enters the tube portion of smaller diameter.

4. A pressure gauge as claimed in claim 1, wherein the perimetral lip of the outer element pressing against the tube wall is able to deflect and momentarily separate from the tube wall when the piston is in its rest position after the measurement.

5. A pressure gauge as claimed in claim 1, provided with a screw for adjusting the rest position of the piston.

6. A pressure gauge as claimed in claim 1, wherein the number of tube portions and the number of constituent elements of the piston are each greater than two, and equal.

7. A pressure gauge as claimed in claim 1, wherein the axes of the tube portions lie on the same straight line.

8. A pressure gauge as claimed in claim 1, wherein the piston is mounted for sliding movement in the tube among the following positions: a first rest position in which the inner element is entered the outer element and this latter only forms seal against the inner walls of the tube portion of greater diameter; a second beginning operative position in which both the elements form seal against the inner walls of the tube; a third operative position in which the two elements are separate and each of them forms seal against the inner walls of the tube portion where sliding.

9. A pressure gauge as claimed in claim 8, wherein at the beginning operative position an annular chamber is formed with the tube walls and the two elements, between their seals formed against said walls.

10. A pressure gauge as claimed in claim 2, wherein, in the rest position of the piston after measurement, the flared perimetral lips of the outer element, pressing against the wall of the tube portion of greater diameter, deflect and momentarily separate from the tube wall.

* * * * *